United States Patent
Won et al.

(10) Patent No.: US 12,215,694 B2
(45) Date of Patent: Feb. 4, 2025

(54) FLOW PATH CONVERSION PUMP

(71) Applicant: LG Electronics Inc., Seoul (KR)

(72) Inventors: Kwangjae Won, Seoul (KR); Seokhyun Ban, Seoul (KR); Joonho Pyo, Seoul (KR); Dohyun Jung, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/096,366

(22) Filed: Nov. 12, 2020

(65) Prior Publication Data
US 2021/0140437 A1 May 13, 2021

(30) Foreign Application Priority Data

Nov. 12, 2019 (KR) .................. 10-2019-0144269
Jan. 7, 2020 (KR) .................. 10-2020-0002228
Jan. 7, 2020 (KR) .................. 10-2020-0002229

(51) Int. Cl.
| F04D 15/00 | (2006.01) |
| F04D 29/42 | (2006.01) |
| F16K 15/14 | (2006.01) |

(52) U.S. Cl.
CPC ..... F04D 15/0005 (2013.01); F04D 29/4293 (2013.01); F16K 15/145 (2013.01)

(58) Field of Classification Search
CPC ...... F04D 13/06; F04D 15/00; F04D 15/0005; F04D 25/06; F04D 27/00; F04D 29/00;
(Continued)

(56) References Cited

U.S. PATENT DOCUMENTS 5,344,293 A * 9/1994 Mota et al. ............. B60S 1/481
417/442
5,984,644 A * 11/1999 Yu et al. ............. F04D 15/0016
417/423.1
(Continued)

FOREIGN PATENT DOCUMENTS

CN 102395789 A 3/2012
CN 104279167 A 1/2015
(Continued)

OTHER PUBLICATIONS

PCT International Search Report in International Appln. No. PCT/KR2020/015195, dated Jan. 29, 2021, 4 pages (English translation only).
(Continued)

*Primary Examiner* — Kenneth J Hansen
*Assistant Examiner* — Chirag Jariwala
(74) *Attorney, Agent, or Firm* — Fish & Richardson P.C.

(57) ABSTRACT

Introduced is a flow path conversion pump comprising: an inlet pipe for guiding a flow of water, an impeller housing having an impeller built therein, and including a first housing outlet and a second housing outlet formed parallel to a tangential direction of rotation of the, a flow path switch forming an internal space, including a first switch inlet and a second switch inlet, which communicate with the first housing outlet and the second housing outlet, respectively, and including a first outlet and a second outlet, which communicate with the first switch inlet and the second switch inlet, respectively, a diaphragm disposed in the internal space of the flow path switch, separating the first switch inlet and the second switch inlet, and separating the first outlet and the second outlet and a motor connected to the impeller to transmit power.

14 Claims, 9 Drawing Sheets

(58) Field of Classification Search
CPC .. F04D 29/002; F04D 29/007; F04D 29/4293; D06F 29/00; D06F 29/002; D06F 29/007; D06F 39/085; D06F 39/088; F16K 15/145; F16K 7/17; F16K 15/144; F16K 15/1402
USPC .......................................................... 417/315
See application file for complete search history.

(56) References Cited

U.S. PATENT DOCUMENTS

| | | | |
|---|---|---|---|
| 9,725,075 | B2 | 8/2017 | Otani |
| 2003/0131890 | A1* | 7/2003 | Xie ....................... F16K 15/202 137/512.15 |
| 2012/0036995 | A1 | 2/2012 | Cochran et al. |
| 2014/0166109 | A1* | 6/2014 | Takai et al. ............ B60S 1/481 137/625.11 |
| 2014/0286747 | A1* | 9/2014 | Fang et al. .......... F04D 29/4293 415/206 |

FOREIGN PATENT DOCUMENTS

| | | | |
|---|---|---|---|
| DE | 4408380 C2 * | 7/1997 | ............. B60S 1/481 |
| EP | 0145672 A2 | 6/1985 | |
| FR | 2703409 A1 | 10/1994 | |
| FR | 2967954 A1 * | 6/2012 | ............... B60S 1/48 |
| GB | 2320061 | 6/1998 | |
| JP | 2697841 | 1/1998 | |
| JP | H10141287 | 5/1998 | |
| JP | 2013009706 | 1/2013 | |
| JP | 5429317 | 2/2014 | |
| JP | 5647811 | 11/2014 | |
| KR | 1020050128532 | 12/2005 | |
| KR | 1020080046066 | 5/2008 | |
| KR | 1020130109354 | 10/2013 | |
| KR | 1020160088205 | 7/2016 | |
| KR | 101735432 | 5/2017 | |
| KR | 1020180076212 | 7/2018 | |
| KR | 1020180076214 | 7/2018 | |
| TW | MS48740 U | 9/2017 | |

OTHER PUBLICATIONS

KR Office Action in Korean Appln. No. 10-2019-0144269, dated Mar. 19, 2021, 13 pages (with English translation).
Office Action in Chinese Appln. No. 202080078146.1, mailed on Mar. 22, 2023, 23 pages (with English translation).
Extended European Search Report in European Appln. No. 20887988.2, mailed on Nov. 7, 2023, 7 pages.
Office Action in Australian Appln. No. 2020267236, mailed on Nov. 22, 2023, 4 pages.

\* cited by examiner

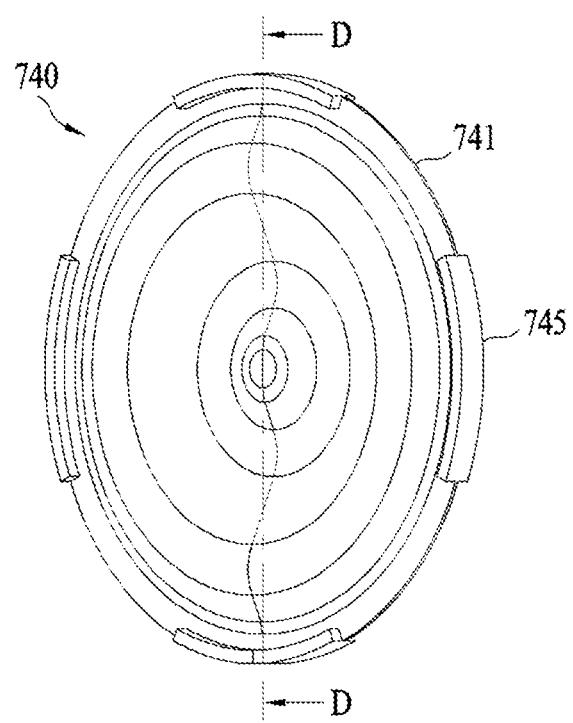 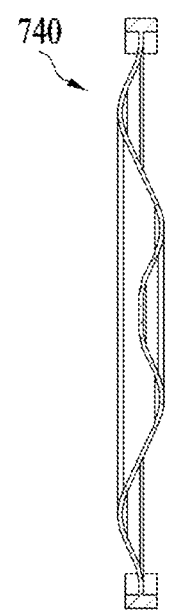
FIG. 9A
FIG. 9B

FLOW PATH CONVERSION PUMP

CROSS-REFERENCE TO RELATED APPLICATIONS

This application claims the benefit of Korean Patent Application No. 10-2019-00144269, filed on Nov. 12, 2019, Korean Patent Application No. 10-2020-0002228, filed on Jan. 7, 2020, and Korean Patent Application No. 10-2020-0002229, filed on Jan. 7, 2020. The disclosures of the prior applications are incorporated by reference in their entirety.

TECHNICAL FIELD

This disclosure relates to relates to a flow path conversion pump that forms two or more water flows with a single motor. One particular implementation relates to a pump disposed mainly in an electronic device such as a washing machine and used to drain or circulate wash water.

BACKGROUND

A washing machine is an apparatus for putting clothes, bedclothes, and the like (hereinafter, also referred to as "laundry") into a drum and then removing contaminants adhered thereto via processes, such as, washing, rinsing, dehydration, and drying. Washing machines are classified as a top loading type and a front loading type according to the type of putting laundry into a drum. The front loading type washing machine is generally referred to as a drum washing machine.

The washing process of the drum washing machine may include an operation of circulating water in the drum and an operation of draining water after washing. A circulation pump and a drainage pump are provided for circulation and drainage operations, respectively. Conventionally, it was common to configure pumps for circulation and drainage with separate motors. In this case, there is a problem that the installation space is limited, and a plurality of motors are required, which is not cost effective.

Korean Patent Application Publication No. 10-2008-0046066, which is a prior art document, discloses a pump having a single motor and two discharge ports.

According to the prior art document, a single motor and an impeller are configured to switch the rotation direction of the impeller to serve as two pumps. However, the structure is complex, making it difficult to assemble. Also, the direction of the flow path is rapidly changed (e.g., right angle or acute angle), causing a large flow loss. In addition, when the diaphragm is not elastically deformed sufficiently, blocking of one side of the flow path may be insufficient, and thus a problem of flowing backward toward an unwanted flow path may occur. In addition, since a force is applied to the diaphragm to induce a continuous elastic deformation, the diaphragm may be damaged or detached.

SUMMARY

The present disclosure has been made in view of the above problems, and it is an object of the present disclosure to provide a flow path conversion pump capable of minimizing the flow loss of the wash water caused by the rotation of the impeller.

Another object of the present disclosure is to provide a flow path conversion pump that is easy to assemble by minimizing the number of parts.

Yet another object of the present disclosure is to provide a flow path conversion pump capable of preventing leakage of water in the flow path due to separation of the diaphragm or reverse flow toward another flow path.

A flow path conversion pump according to an embodiment of the present disclosure may comprise: an inlet pipe configured to guide a flow of water, an impeller housing fluidly connected to the inlet pipe to receive water introduced from the inlet pipe, having an impeller built therein, and including a first housing outlet and a second housing outlet formed parallel to a tangential direction of rotation of the impeller, a flow path switch forming an internal space, including a first switch inlet and a second switch inlet, which fluidly communicate with the first housing outlet and the second housing outlet, respectively, and including a first outlet and a second outlet, which fluidly communicate with the first switch inlet and the second switch inlet, respectively, a diaphragm disposed in the internal space of the flow path switch, separating the first switch inlet and the second switch inlet, and separating the first outlet and the second outlet and a motor connected to the impeller to rotate the impeller. Through this, it is possible to use one impeller to perform the functions of two pumps. By continuously forming the first flow path leading to the first housing outlet, the first switch inlet and the first outlet and the second flow path the second housing outlet, the second switch inlet, and the second outlet, it is possible to minimize backflow and leakage flow loss.

The first housing outlet and the second housing outlet may be extended in a same direction.

When viewed from a first direction, the flow path switch may be extended from a first portion to a second portion in a second direction and has a width that decreases from the first portion toward a middle portion in the second direction and increases from the middle portion toward the second portion in the second direction, the middle portion being disposed between the first portion and the second portion.

When viewed from a third direction perpendicular to the first direction and the second direction, the flow path switch may be circular. This facilitates opening and closing of the first and second flow paths, and minimizes flow loss.

A sealing line may be extended from an inner side of the flow path switch toward the internal space of the flow path switch at the middle portion.

The flow path switch may include two parts that are disposed around the diaphragm, and wherein at least a portion of the diaphragm is overlapped with the two parts and sandwiched between the two parts.

An interface between the flow path switch and the portion of the diaphragm may define a closed curve. This facilitates assembly of the diaphragm and the flow path switch, and the number of parts can be reduced.

The diaphragm may include an elastic material, and has a circular plate shape that includes a central portion configured to protrude away from a plane of the circular plate shape with a curvature.

The protruding direction of the central portion of the diaphragm may be configured to change by 180° relative to the plane of the circular plate shape by an external force. This prevents the diaphragm from continuing in its elastic deformation state, thereby improving the durability of the diaphragm and improving the reliability of the flow path closure.

The diaphragm has a circular plate shape that may include a central portion configured to elastically protrude away from a plane of the circular plate shape, and wherein the central portion of the diaphragm is configured to sealingly contact the sealing line of the flow path switch.

The diaphragm may define a continuous curvature that varies from an outermost portion of the diaphragm to the central portion of the diaphragm based on protrusion of the central portion.

The diaphragm may be formed to have a uniform thickness as a whole, and a coupling portion may be formed at the outermost portion with a thickness thicker than other portions. Through this, the sealing performance of the assembly part of the flow path switch can be improved.

The diaphragm may be disposed to close either the first housing outlet, the first switch inlet and the first outlet, or the second housing outlet, the second switch inlet and the second outlet.

The diaphragm may be formed of an elastic material, and may be in a shape of a circular plate with a protruding central portion and wrinkles.

The protruding direction of the central portion of the diaphragm may be configured to change by 180° relative to the plane of the circular plate shape by an external force. e.

The diaphragm may be formed to have a uniform thickness as a whole, and a bent portion may be formed adjacent to the outermost portion with a thickness thinner than other portions. Through this, it is possible to easily change the protruding direction of the diaphragm.

At least one of the first outlet and the second outlet may be formed to be positioned on the same line as at least one of the first switch inlet and the second switch inlet.

The flow path conversion pump according to various embodiments of the present disclosure can minimize the flow loss of the wash water caused by the rotation of the impeller by forming a deformation angle of the flow path to be an obtuse angle.

In the flow path conversion pump according to various embodiments of the present disclosure, it is easy to assemble the diaphragm and the flow path switch, and the flow path switch is sealed at the same time as the assembly, thereby simplifying the structure.

The flow path conversion pump according to various embodiments of the present disclosure can prevent a continuous elastic deformation state from being maintained by using a diaphragm pre-formed in a specific shape.

BRIEF DESCRIPTION OF THE DRAWINGS

The above and other aspects, features, and advantages of certain embodiments will be more apparent from the following detailed description taken in conjunction with the accompanying drawings, in which:

FIGS. 9A and 9B are views showing a diaphragm according to another embodiment of the present disclosure.

DETAILED DESCRIPTION

Figure 1:
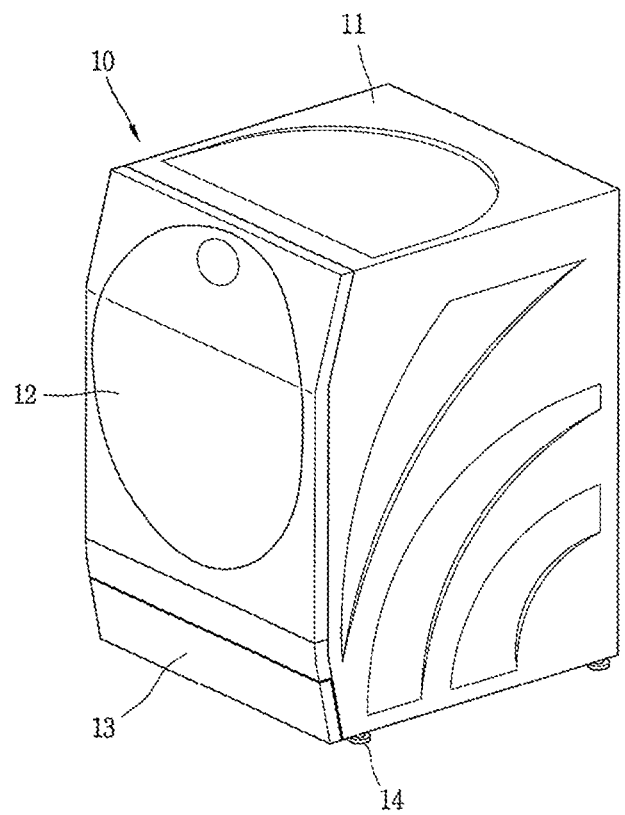
FIG. 1 is a perspective view showing the appearance of a washing machine to which a flow path conversion pump according to an embodiment of the present disclosure can be applied.

Hereinafter, exemplary embodiments disclosed in the present specification will be described in detail with reference to the accompanying drawings, but identical or similar elements are denoted by the same reference numerals regardless of drawing numbers, and redundant descriptions thereof will be omitted. The suffixes "module" and "unit" for components used in the following description are given or used interchangeably in consideration of only the ease of preparation of the specification, and do not have meanings or roles that are distinguished from each other. In addition, in describing the embodiments disclosed in the present specification, when it is determined that a detailed description of related known technologies may obscure the gist of the embodiments disclosed in the present specification, the detailed description thereof will be omitted. In addition, the accompanying drawings are for easy understanding of the embodiments disclosed in the present specification, but the technical idea disclosed in the present specification is not limited by the accompanying drawings, and it should be understood to include all modifications, equivalents, or substitutes included in the spirit and scope of the present disclosure.

Terms including an ordinal number such as first and second may be used to describe various elements, but the elements are not limited by the terms. These terms are used only for the purpose of distinguishing one component from another component.

When a component is referred to as being "coupled" or "connected" to another component, it should be understood that it may be directly coupled or connected to the other component, but other components may exist in the middle. On the other hand, when a component is referred to as being "directly coupled" or "directly connected" to another component, it should be understood that there is no other component in the middle.

Singular expressions include plural expressions unless the context clearly indicates otherwise.

In the present application, terms such as "comprise" or "have" are intended to designate the presence of features, numbers, steps, actions, components, parts, or combinations thereof described in the specification, but it is to be understood that it does not preclude in advance the possibility of the presence or addition of one or more other features, numbers, steps, actions, components, parts, or combinations thereof.

FIG. 1 is a perspective view showing the appearance of a washing machine to which a flow path conversion pump according to an embodiment of the present disclosure can be applied.

A washing machine 10 includes a cabinet 11 defining an exterior, a drum 21 which is rotatably mounted inside the cabinet 11 and into which laundry is put, a lifter (not shown) installed inside the drum 21, and a door 12 installed in front of the cabinet 11. In addition, a detergent inlet cover 13 for covering a detergent inlet is positioned at the lower side of the cabinet 11.

A storage container (not shown) that accommodates detergent and fabric softener and can be withdrawn to the outside of the cabinet 11, a plurality of elastic members (not shown) and damper (not shown) that support the drum 21 and suppress vibration, and a driving motor (not shown) for rotating the drum 21 may be provided at the bottom of the washing machine 10. In addition, a door 12 may be provided on the front side of the cabinet 11 so that laundry to be washed can enter and exit. The door 12 may be configured to open and close the front of the drum 21. The door 12 may be formed in a disc shape. An electric heater (not shown) capable of heating water when power is applied may be provided under the drum 21.

A flow path conversion pump (not shown) may be provided at the lower side of the drum 21 to drain the wash water inside the drum 21 or to circulate the water from the drum 21 to flow into the upper area of the drum 21. A plurality of legs 14 that are spaced apart from the ground by a predetermined height to support the washing machine 10 are positioned thereunder.

Figure 2:
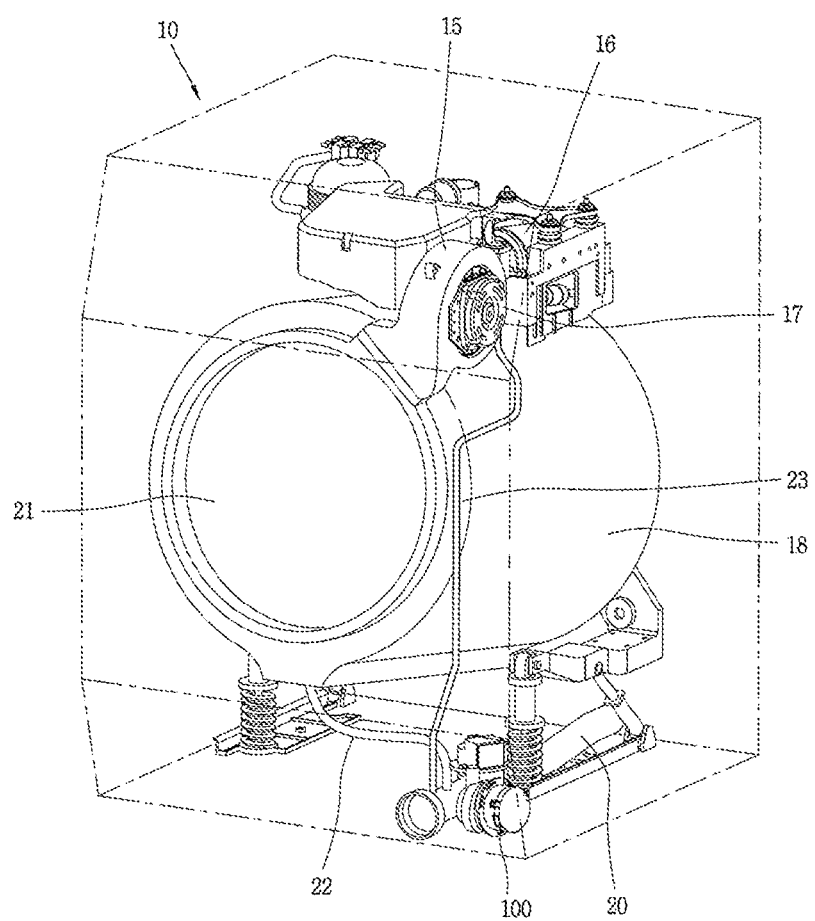
FIG. 2 is a perspective view showing an interior view of a washing machine including a flow path conversion pump according to an embodiment of the present disclosure.

FIG. 2 is a perspective view showing an interior view of a washing machine including a flow path conversion pump according to an embodiment of the present disclosure.

The washing machine 10 includes a cabinet 11 defining an exterior, a tub 18 accommodated in the cabinet 11, and a drum 21 which is rotatably mounted inside the tub 18 and into which laundry is put. In addition, it includes the drum 21, a heat exchanger, and a fan motor 17, and includes a compressor 16 and a compressor support (not shown) for supporting the compressor 16. In addition, the washing machine 10 includes a flow path conversion pump 100, a drain hose 20, and a drain connection pipe (not shown).

The flow path conversion pump 100 according to an embodiment of the present disclosure is located at the lower side of the washing machine 10. The flow path conversion pump 100 performs a circulation process of transferring wash water toward the tub via a first housing outlet 121 (see FIG. 3), a first switch inlet 131 (see FIG. 3) and a first outlet 135 (see FIG. 3) or a drainage process of discharging wash water to the outside via the second housing outlet 123 (see FIG. 3), the second switch inlet 133 (see FIG. 3) and the second outlet 137 (see FIG. 3) with a single motor 150 by driving the motor 150.

Figure 3:
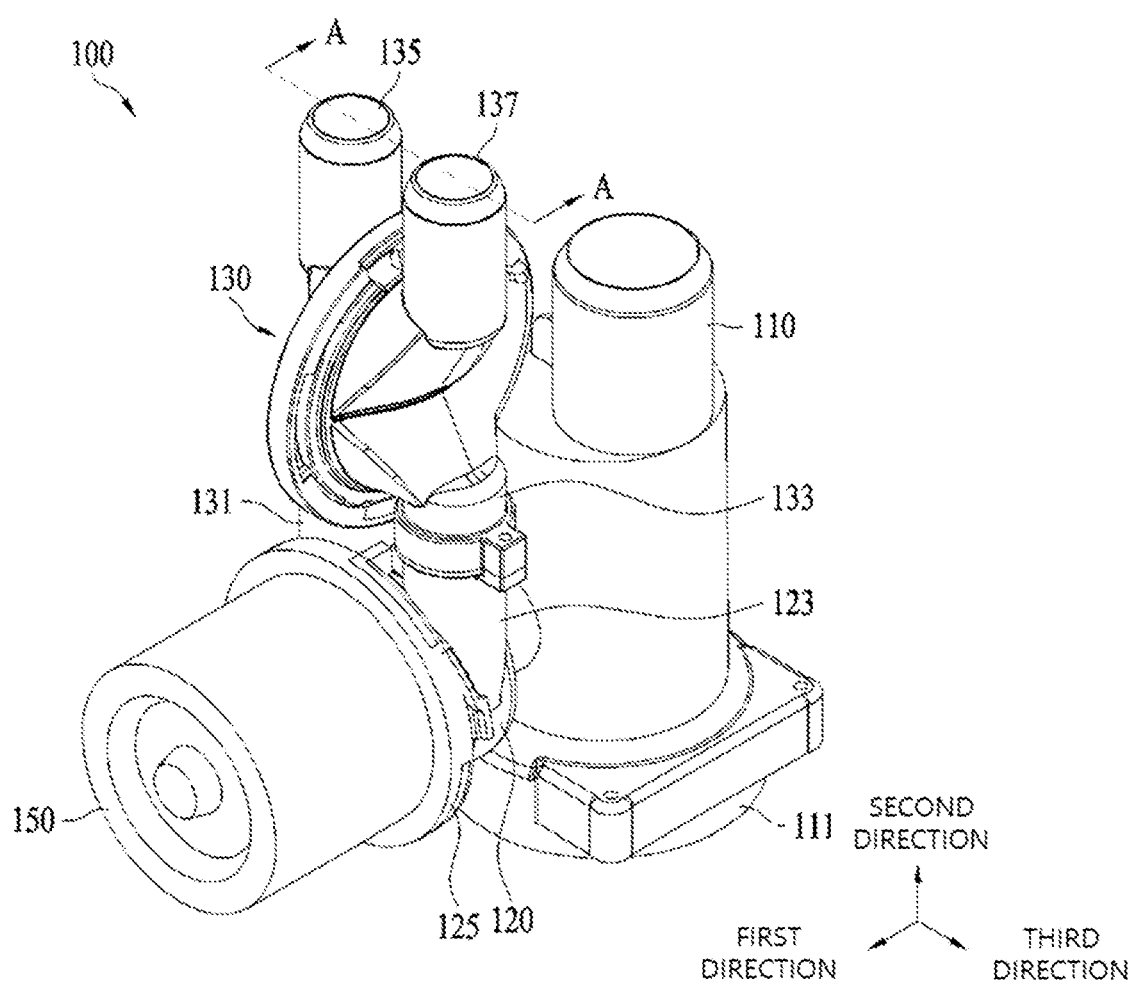
FIG. 3 is a perspective view of a flow path conversion pump according to an embodiment of the present disclosure.
Figure 4:
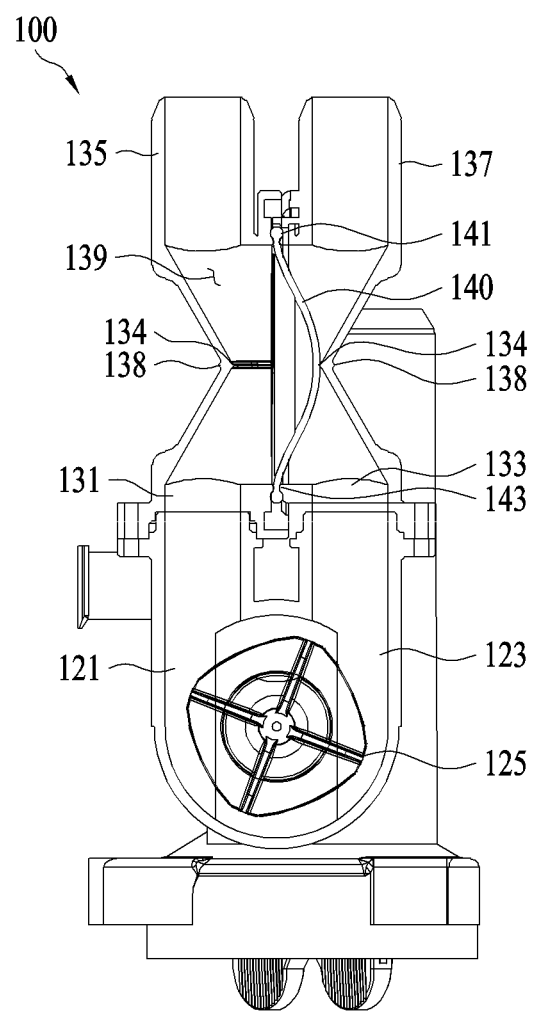
FIG. 4 is a cross-sectional view taken along line A-A of FIG. 3.

FIG. 3 is a perspective view of a flow path conversion pump 200 according to an embodiment of the present disclosure, and FIG. 4 is a cross-sectional view taken along line A-A of FIG. 3.

Referring to FIGS. 3 to 4, the flow path conversion pump 100 according to an embodiment of the present disclosure may include an inlet pipe 110, an impeller housing 120, a flow path switch 130, a diaphragm 140, and a motor 150.

The flow path conversion pump 100 according to an embodiment is a pump that converts a flow path of a fluid, and may convert both gas and liquid flow paths. However, in order to help the understanding of the present disclosure, it may be described based on a liquid such as wash water.

The inlet pipe 110 according to an embodiment may store or transfer water for recirculation to the tub 18 (see FIG. 2) or water to be drained after washing is completed to the impeller housing 120. The water supplied to the inlet pipe 110 may be collectively defined as wash water. The inlet pipe 110 has a pipe shape, one side of which may be supplied with wash water from the tub 18 or the outside, and the other side of which may be closed with an openable stopper 111. The stopper 111 can be opened and closed according to the user's selection, and by removing the stopper 111, wash water accumulated in the inlet pipe 110 may be removed or foreign substances may be removed. A hole is formed in the outer circumferential surface of the inlet pipe 110 to communicate with the impeller housing 120. By forming the hole for connecting to the impeller housing 120 on the outer circumferential surface of the inlet pipe 110, the inflow path of the wash water can be bent. Through this, it is possible to prevent foreign matters that may be mixed with the wash water from directly entering the impeller 125 (see FIG. 4) and causing damage. In other words, by bending the inflow path of the wash water once, it serves as a structural filter to make the foreign matters, which may cause serious damage to the impeller 125 due to the weight among the foreign matters introduced with the flow of the wash water, move to the stopper 111 and prevent them from entering the hole.

The impeller housing 120 according to an embodiment communicates with the hole formed on the outer circumferential surface of the inlet pipe 110 and may receive wash water through the hole. The impeller housing 120 may include an impeller 125 connected to the motor 150 and rotating in an arbitrary direction. For example, the impeller 125 may rotate clockwise or counterclockwise according to the rotation direction of the motor 150. According to the rotation direction of the impeller 125 as described above, the flow of wash water in the flow path conversion pump 100 may be changed. In addition, by controlling the rotation direction and speed of the motor 150, it may operate at a high speed during the draining process to quickly discharge water, and, during the circulation process, it may operate at a relatively low speed compared to the draining process to prevent unnecessary noise and power consumption.

The impeller housing 120 according to an embodiment may include a first housing outlet 121 and a second housing outlet 123. The first housing outlet 121 and the second housing outlet 123 may be formed in parallel in a direction tangential to the rotation direction of the impeller 125. For example, if the first housing outlet 121 is formed parallel to the tangential direction when the impeller 125 rotates in the clockwise direction, the second housing outlet 123 may be formed parallel to the tangential direction when the impeller 125 rotates in the counterclockwise direction. By disposing the first housing outlet 121 and the second housing outlet 123 in parallel in directions tangential to the rotation directions of the impeller 125, the flow loss of the wash water generated by the impeller 125 can be minimized.

The first housing outlet 121 and the second housing outlet 123 according to an embodiment may be disposed to face the same direction. By arranging the first housing outlet 121 and the second housing outlet 123 to face the same direction, the connection with the flow path switch 130 to be described later and the inflow of wash water are facilitated, and the volume of the flow path switch 130 can be reduced.

The flow path switch 130 according to an embodiment may include a first switch inlet 131, a second switch inlet 133, a first outlet 135 and a second outlet 137. The first switch inlet 131 according to an embodiment may be coupled to communicate with the first housing outlet 121, and the second switch inlet 133 may be coupled to communicate with the second housing outlet 123. The first switch inlet 131 and the second switch inlet 133 are extended along the direction of the first housing outlet 121 and the second housing outlet 123 to be supplied with wash water while minimizing the flow loss of the water flow generated by the impeller 125. Wash water introduced through the first switch inlet 131 may be discharged to the first outlet 135 through the internal space 139. As described above, a flow path leading to the first housing outlet 121, the first switch inlet 131 and the first outlet 135 may be defined as a first flow path. In addition, the wash water introduced through the second switch inlet 133 may be discharged to the second outlet 137 through the internal space 139. As described above, a flow path leading to the second housing outlet 123, the second switch inlet 133, and the second outlet 137 may be defined as a second flow path. The internal space 139 of the flow path switch 130 is divided by a diaphragm 140 to be described later to prevent mixing of the wash water entered through the first switch inlet 131 and the wash water entered through the second switch inlet 133. In addition, the diaphragm 140 may be formed to block the second switch inlet 133 when the first switch inlet 131 is opened, and block the first switch inlet 131 when the second switch inlet 133 is opened. In other words, the diaphragm 140 may be formed to open only one out of the first flow path and the second flow path.

As described above, different water flows are generated in the two flow paths according to the rotation direction of the impeller 125 to supply wash water, so that one motor 150 can serve as two pumps. For example, when the first outlet 135 is connected to a circulation pipe (not shown) connected to the tub 18, it can serve as a circulation pump, and, when the second outlet 137 is connected to a drain hose 20 (refer to FIG. 2), it can serve as a drainage pump.

In describing the flow path conversion pump 100 according to an embodiment of the present disclosure, a direction may be defined and used to aid understanding. For example, the first direction is a direction facing the motor 150, the first housing outlet 121, and the second housing outlet 123 at the same time, and it may refer to a direction toward the lower left side based on the illustrated state of FIG. 3. The second direction is perpendicular to the first direction and may refer to a direction facing upward based on the illustrated state of FIG. 3. The third direction is a direction perpendicular to the first direction and the second direction, and may refer to a lower right direction based on the illustrated state shown in FIG. 3.

The direction definition as described above is only for aiding understanding of the present disclosure and is not absolute, and when one direction reference is changed, the other direction reference may be changed in response thereto.

When viewed from the first direction, the flow path switch 130 according to an embodiment may be formed in a mortar shape that becomes narrower in width while extending in the second direction and then becomes wider again in the central portion 138. As described above, the flow path switch 130 is formed to close one flow path when the other flow path is opened by the built-in diaphragm 140. At this time, if the flow path switch 130 is formed to have the same width, when one flow path is opened to close the other flow path, one flow path is widened. In this case, a large flow loss may occur due to the sudden expansion of the flow path. In addition, the force to pressurize the diaphragm 140 is reduced, so that the force to close the other flow path is insufficient, and the wash water may flow back to the other flow path. Accordingly, in the present disclosure, even if the diaphragm 140 opens one flow path and closes the other flow path, the flow pressure of the wash water can be prevented from sudden lowering and the pressure of the diaphragm 140 for closing the flow path on the other side can be maintained by reducing the width of the central portion 138 of the flow path switch 130. For example, the width of the central portion 138 of the flow path switch 130 may be similar to the width of the first switch inlet 131 or the second switch inlet 133. By gradually decreasing the width of the central portion 138 of the flow path switch 130, rapid change of the flow path can be prevented, thereby minimizing flow pressure loss of wash water.

The flow path switch 130 according to an embodiment may have a circular shape when viewed from a third direction. It is formed in correspondence with the outer shape of the diaphragm 140 to be described later, and is coupled to be overlapped with a portion of the outermost portion 141 of the diaphragm 140, so that the path leading to the first housing outlet 121, the first switch inlet 131, and the first outlet 135 and the path leading to the second housing outlet 123, the second switch inlet 133, and the second outlet 137 can be distinguished.

The diaphragm 140 according to an embodiment may be formed of a rubber material that is circular and elastically deformable, and may have a shape of a circular plate with a protruding central portion having a gentle curvature. The diaphragm 140 may be formed such that the protruding direction is changed by 180° when a force of a certain amount or more is applied to the central portion. For example, when wash water flows into the first flow path, the central portion of the diaphragm 140 protrudes toward the second flow path due to the flow pressure, and abuts the central portion 138 of the flow path switch 130 to block the second housing outlet 123. The degree of protrusion of the central portion of the diaphragm 140 is such that the first housing outlet 121 or the second housing outlet 123 can be blocked. For example, the central portion of the diaphragm 140 may contact the sealing line 134 to be described later, or the central portion may protrude to be pressed by a predetermined degree. As the central portion of the diaphragm 140 protrudes while forming a gentle curvature, and the flow path switch 130 is gradually widened again from the central portion 138 toward the second direction, the flow loss of the wash water can be minimized.

Figure 5:
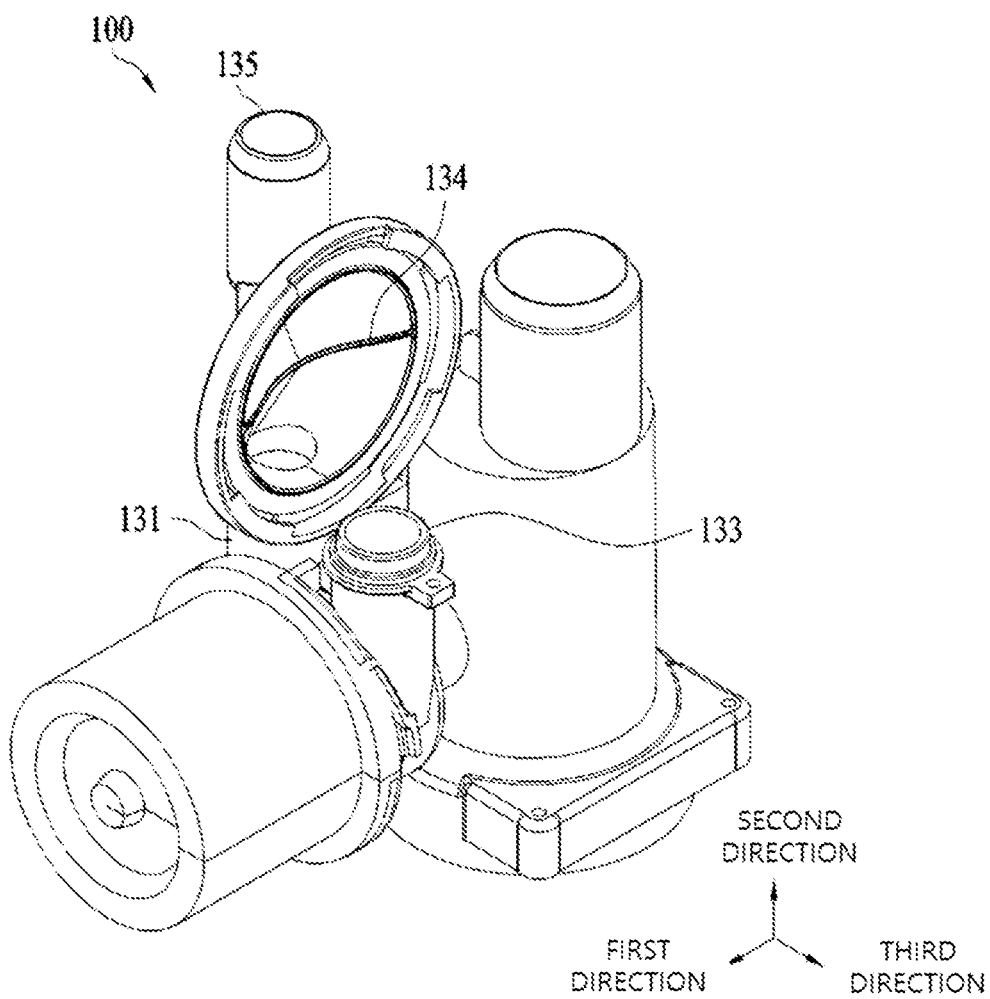
FIG. 5 is a view showing the interior of a flow path switch according to an embodiment of the present disclosure.

FIG. 5 is a view showing the interior of a flow path switch 130 according to an embodiment of the present disclosure. More specifically, it is a view in which a partial configuration of the flow path switch 130 is omitted.

The flow path switch 130 according to an embodiment may be divided into two parts around the diaphragm 140. For example, it may be divided into a part forming a first flow path and a part forming a second flow path. The flow path switch 130 may be coupled with the diaphragm 140 interposed therebetween and overlapped with a portion of the outermost portion 141 of the diaphragm 140, and the overlapping portion of the outermost portion 141 and the flow path switch may form a closed curve. As described above, it is coupled with the diaphragm 140 in an overlapping state with a portion of the outermost portion 141 to separate the first flow path and the second flow path, and at the same time, seal the coupling portion of the two parts to prevent leakage. The assembly of the flow path switch 130 may be performed, for example, by rotating the diaphragm 140 in a state in which circularly formed portions are brought into contact with each other to be assembled. However, it is not limited to this method and any method capable of combining two parts may be applied in various ways.

A sealing line 134 may be formed on an inner surface of the central portion 138 of the flow path switch 130 according to an embodiment. The sealing line 134 forms a band from the inner surface of the central portion 138 and protrudes, and may form a ring shape when two parts of the flow path switch 130 are assembled. The sealing line 134 may be formed corresponding to the protruding shape of the diaphragm 140. As described above, the sealing line 134 and the diaphragm 140 may be in line contact with each other, or may be in contact with each other for the center of the diaphragm 140 to be pressed by a predetermined degree.

Figure 6A:
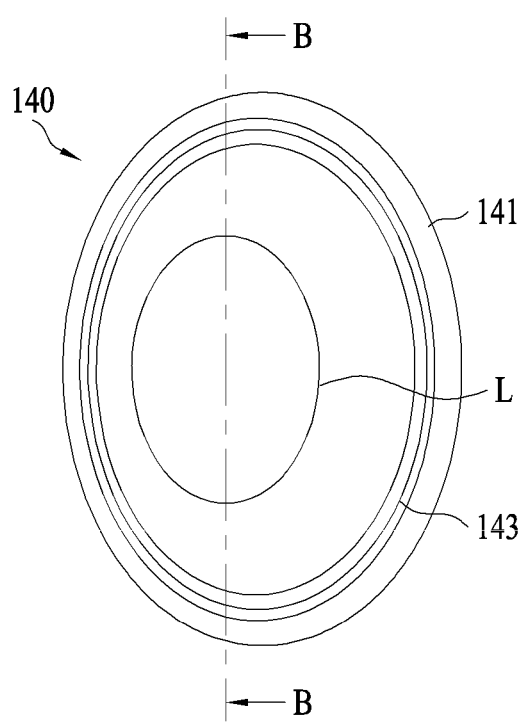
FIGS. 6A and 6B are views showing a diaphragm according to an embodiment of the present disclosure.
Figure 6B:
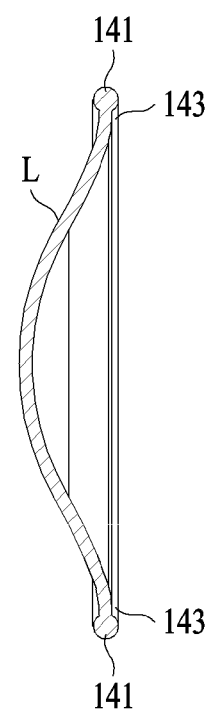

FIGS. 6A and 6B are views showing a diaphragm 140 according to an embodiment of the present disclosure. More specifically, FIG. 6A is a perspective view of the diaphragm 140, and FIG. 6B is a cross-sectional view taken along line B-B of FIG. 6A.

Referring to FIGS. 6A and 6B, the diaphragm 140 according to an embodiment may be formed of a rubber material that is elastically deformable, and may have a shape of a circular plate with a protruding central portion forming a gentle curvature. The diaphragm 140 is pre-formed to maintain the protruding shape of the central portion, and it may be formed such that the protruding direction is changed by 180° when a force of a certain amount or more is applied to the central portion. As the diaphragm 140 maintains a protruding state in one direction, either side of the first flow path or the second flow path may be closed and the other side may be open. By pre-forming the diaphragm 140 to close one flow path, it is possible to greatly reduce the flow pressure of the wash water required to close the flow path on one side. Through this, not only the durability of the diaphragm 140 can be increased, it is possible to more reliably close any one side of the flow path and prevent reverse flow of wash water. The central portion of the diaphragm 140 protrudes while forming a gentle curvature in a continuous shape, but the curvature may be changed at least once. For example, it may be deformed so that the amount of protrusion of the central portion decreases with respect to the reference line L shown in FIGS. 6A and 6B. In the outermost portion 141 of the diaphragm 140, the curvature is formed large to protrude rapidly so that the amount of protrusion is larger than that of the central portion. Accordingly, the change in the protruding direction of the diaphragm 140 can be made more clearly. In the central portion of the diaphragm 140, the curvature is formed to be relatively small so that the amount of protrusion is relatively small, so that the change in the path of the first flow path or the second flow path is made as smooth as possible, thereby minimizing flow loss.

The diaphragm 140 according to an embodiment is formed to have a uniform thickness as a whole, and a coupling portion 141 may be formed with a thickness thicker than other portions at the outermost portion 141. As described above, the flow path switch 130 is coupled with the diaphragm 140 interposed therebetween and overlapped with a portion of the outermost portion 141 of the diaphragm 140 so that the coupling portion of the two parts are sealed to prevent leakage. Accordingly, the durability and sealing force of the diaphragm 140 can be increased by forming a thick overlapping portion of the outermost portion 141. Adjacent to the outermost portion 141 of the diaphragm 140 according to an embodiment may be formed a bent portion 143 having a thickness thinner than that of other portions. In particular, the diaphragm 140 is formed to be converted by the flow pressure of the wash water flowing through the first flow path or the second flow path without disposing a separate actuator for changing the protruding direction. However, as described above, by controlling the rotational speed of the motor 150, it can be controlled to rotate quickly when draining and to rotate relatively slowly during circulation. When the motor 150 rotates slowly, the flow pressure of the wash water may be lowered. Even in this case, a thin portion such as the bent portion 143 may be provided to facilitate the conversion of the protruding direction of the diaphragm 140.

Figure 7:
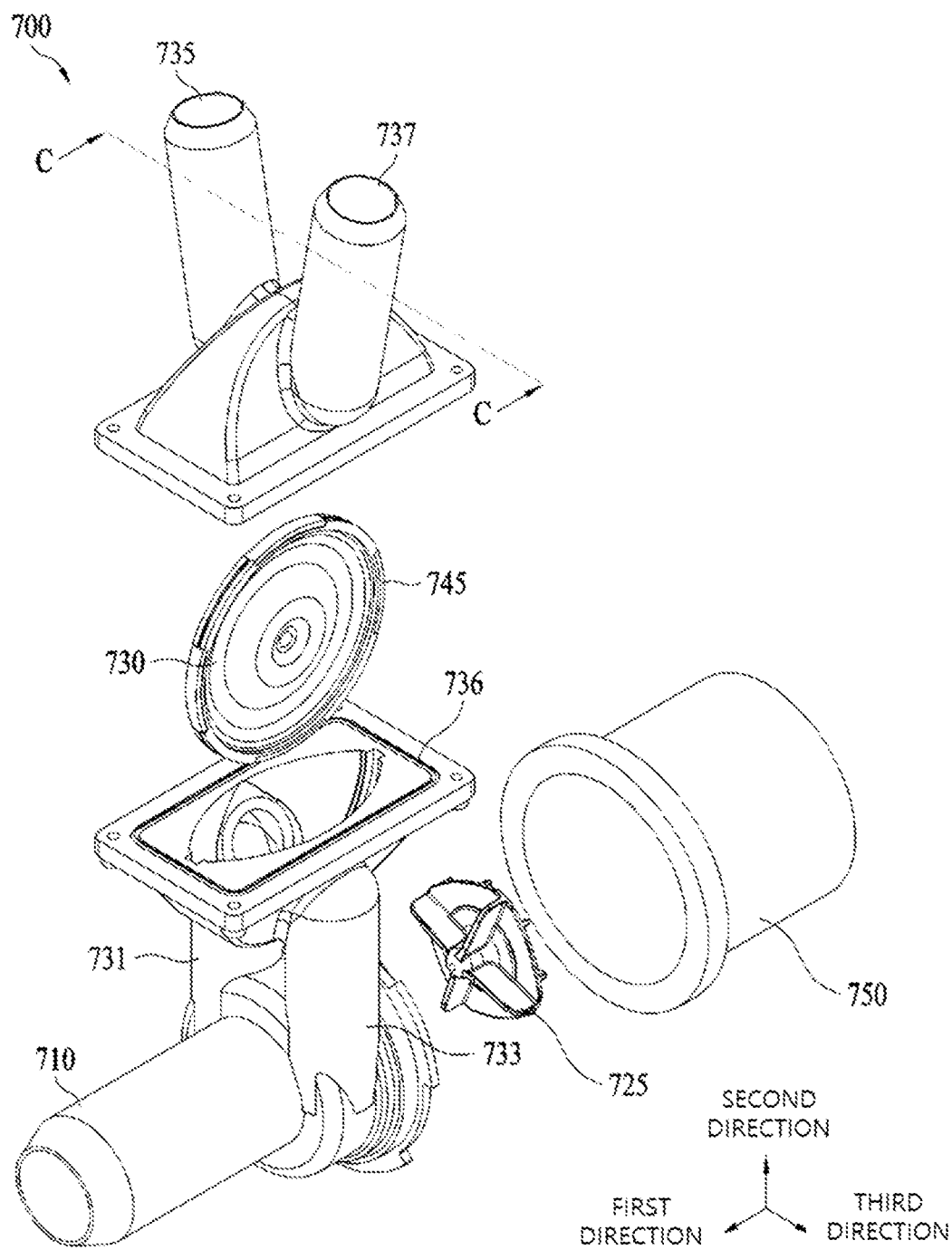
FIG. 7 is a perspective view of a flow path conversion pump according to another embodiment of the present disclosure.
Figure 8:
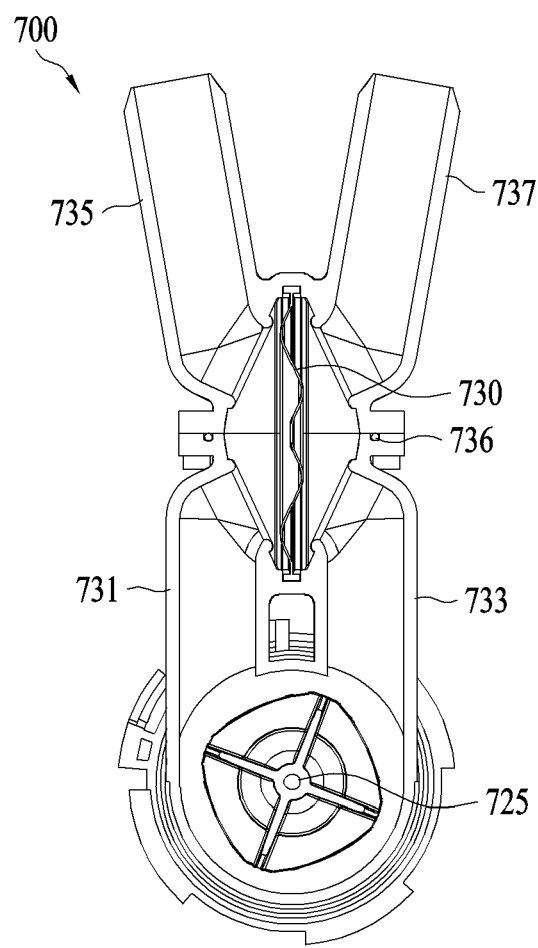
FIG. 8 is a cross-sectional view taken along line C-C of FIG. 7.

FIG. 7 is a perspective view of a flow path conversion pump 700 according to another embodiment of the present disclosure, and FIG. 8 is a cross-sectional view taken along line C-C of FIG. 7.

In describing the flow path conversion pump 700 according to another embodiment of the present disclosure, in order to aid understanding of the present disclosure, the difference compared to the flow path conversion pump 100 of FIGS. 1 to 6 may be mainly described. The same or similar reference numerals may also be used for the same or similar components compared to the flow path conversion pump 100 of FIGS. 1 to 6.

The flow path conversion pump 700 according to another embodiment of the present disclosure may have a difference in the shape of the flow path switch 730 and the diaphragm 740.

The flow path switch 730 according to another embodiment is formed of two parts, which may be divided in a direction dividing the first and the second switch inlet 735 and 737 and the first and the second outlet 731 and 733. In other words, it may have a shape cut along a plane perpendicular to the second direction. When assembling the flow path switch 730, a rubber ring 736 or a gasket 736 may be disposed to seal the parting line.

In the diaphragm 740 according to another embodiment, a coupling ring 745 may be formed at the outermost portion 741. In the case of the diaphragm 740, since it is formed of an elastic material, it may be difficult to fix the position within the flow path switch 730 only by its own shape. Accordingly, a coupling ring formed of a metal material or a plastic material having high rigidity may be disposed so that the coupling ring 745 is fitted in the assembly process of the flow path switch 730.

FIGS. 9A and 9B are views showing a diaphragm according to another embodiment of the present disclosure. More specifically, FIG. 9A is a perspective view of the diaphragm 740, and FIG. 9B is a cross-sectional view taken along line D-D of FIG. 9A.

The diaphragm 740 according to another embodiment may have a shape in which wrinkles are formed while going from the outermost portion 741 to the central portion. In addition, the central portion does not protrude in any one direction in advance and may be located on the same plane as the outermost portion 741. When wash water flows into the first flow path or the second flow path, it may be transformed to protrude to one side by the flow pressure of the wash water, and if there is no flow of wash water in the flow path, the central portion may be return to the position flush with the outermost portion 741.

It will be apparent to those skilled in the art that various modifications and variations can be made in the present disclosure without departing from the spirit or scope of the disclosure.

The above detailed description should not be construed as restrictive in all respects and should be considered as illustrative. The scope of the present disclosure should be determined by reasonable interpretation of the appended claims, and all modifications within the equivalent scope of the present disclosure are included in the scope of the present disclosure.

What is claimed is:

1. A flow path conversion pump comprising:
   an inlet pipe configured to guide a flow of water;
   an impeller housing fluidly connected to the inlet pipe to receive water introduced from the inlet pipe, having an impeller built therein, and including a first housing outlet and a second housing outlet formed parallel to a tangential direction of rotation of the impeller;

a flow path switch forming an internal space, including a first switch inlet and a second switch inlet, which fluidly communicate with the first housing outlet and the second housing outlet, respectively, and including a first switch outlet and a second switch outlet, which fluidly communicate with the first switch inlet and the second switch inlet, respectively;

a diaphragm that is formed as a single part, that is disposed in the internal space of the flow path switch, that separates the first switch inlet from the second switch inlet, and that separates the first switch outlet from the second switch outlet; and a motor that is connected to the impeller and configured to rotate the impeller, wherein the diaphragm is configured to selectively close (i) a first flow path through the first housing outlet, the first switch inlet, and the first switch outlet or (ii) a second flow path through the second housing outlet, the second switch inlet, and the second switch outlet, wherein the diaphragm includes an elastic material and has a circular plate shape, the diaphragm including a curved central portion configured to protrude away from a plane of the circular plate shape with a curvature, and the diaphragm being pre-formed to maintain the protruding shape of the curved central portion and configured to close a side of the first flow path or the second flow path and open an opposite side of the first flow path or the second flow path, wherein a protruding direction of the curved central portion of the diaphragm is configured to, based on an external force, change in an opposite direction relative to the plane of the circular plate shape, the protruding direction of the curved central portion of the diaphragm being maintained based on the external force being eliminated, wherein the diaphragm defines a continuous curvature that varies from an outermost portion of the diaphragm to a middle of the curved central portion of the diaphragm based on protrusion of the curved central portion of the diaphragm, and wherein the first flow path or the second flow path is configured to change between an open state and a closed state based on a change of the protruding direction of the curved central portion of the diaphragm.

2. The flow path conversion pump of claim 1, wherein the first housing outlet and the second housing outlet extend in a same direction.

3. The flow path conversion pump of claim 2, wherein when viewed from a first direction, the flow path switch extends from a first portion to a second portion in a second direction and has a width that decreases from the first portion toward a middle portion in the second direction and increases from the middle portion toward the second portion in the second direction, the middle portion being disposed between the first portion and the second portion.

4. The flow path conversion pump of claim 3, wherein, when viewed from a third direction perpendicular to the first direction and the second direction, the flow path switch is circular.

5. The flow path conversion pump of claim 3, further comprising: a sealing line that extends from an inner side of the flow path switch toward the internal space of the flow path switch at the middle portion.

6. The flow path conversion pump of claim 5, wherein the diaphragm has the circular plate shape, wherein the curved central portion of the diaphragm is configured to elastically protrude away from the plane of the circular plate shape, and wherein the curved central portion of the diaphragm is configured to sealingly contact the sealing line of the flow path switch.

7. The flow path conversion pump of claim 1, wherein the flow path switch includes two parts that are disposed around the diaphragm, and wherein at least a portion of the diaphragm is overlapped with the two parts and sandwiched between the two parts.

8. The flow path conversion pump of claim 7, wherein an interface between the flow path switch and the portion of the diaphragm defines a closed curve.

9. The flow path conversion pump of claim 1, wherein the diaphragm includes a coupling portion at the outermost portion, the coupling portion being thicker than other portions of the diaphragm.

10. The flow path conversion pump of claim 9, wherein the flow path switch includes two parts that are disposed around the diaphragm, and wherein the coupling portion of the diaphragm is overlapped with the two parts and sandwiched between the two parts.

11. The flow path conversion pump of claim 9, wherein the diaphragm includes a bent portion adjacent to the outermost portion, the bent portion being thinner than other portions of the diaphragm.

12. The flow path conversion pump of claim 1, wherein at least one of the first switch outlet or the second switch outlet extends along a same line as at least one of the first switch inlet or the second switch inlet.

13. The flow path conversion pump of claim 1, wherein the diaphragm is configured to, based on the motor rotating the impeller clockwise, receive a first external force from a water flow along the first flow path through the first housing outlet, the first switch inlet, and the first switch outlet, wherein the first external force causes the diaphragm to protrude toward and block the second flow path through the second housing outlet, the second switch inlet, and the second switch outlet.

14. The flow path conversion pump of claim 1, wherein the diaphragm is configured to, based on the motor rotating the impeller counterclockwise, receive a second external force from a water flow along the second flow path, wherein the second external force causes the diaphragm to protrude toward and block the first flow path.

* * * * *